United States Patent [19]

Moriya et al.

[11] 4,446,380

[45] May 1, 1984

[54] KEYLESS DEVICE ACTUATING SYSTEM FOR AN AUTOMOTIVE VEHICLE

[75] Inventors: Makoto Moriya, Tokyo; Haruo Mochida, Aiko, both of Japan

[73] Assignee: Nissan Motor Company, Limited, Yokohama City, Japan

[21] Appl. No.: 445,555

[22] Filed: Nov. 30, 1982

[30] Foreign Application Priority Data

Feb. 15, 1982 [JP] Japan .................................. 57-21302

[51] Int. Cl.³ .......................... H02J 3/14; H02G 3/00
[52] U.S. Cl. ................................. 307/10 AT; 361/172; 340/64
[58] Field of Search ........................ 307/10 R, 10 AT; 361/172; 340/64, 543, 825.31, 825.32

[56] References Cited

U.S. PATENT DOCUMENTS

| 3,691,396 | 9/1972 | Hinrichs | 340/64 X |
| 4,090,089 | 5/1978 | Morello et al. | 340/64 X |
| 4,205,325 | 5/1980 | Haygood et al. | 307/10 R X |
| 4,232,289 | 11/1980 | Daniel | 340/64 |
| 4,240,516 | 12/1980 | Henderson et al. | 307/10 AT X |
| 4,342,024 | 7/1982 | Rossi | 307/10 AT X |
| 4,366,466 | 12/1982 | Lutz | 361/172 X |

Primary Examiner—Reinhard J. Eisenzopf
Assistant Examiner—Derek Jennings
Attorney, Agent, or Firm—Schwartz, Jeffery, Schwaab, Mack, Blumenthal & Koch

[57] ABSTRACT

A keyless vehicle device actuating system for an automotive vehicle combined with an electronic vehicle door unlocking system. Since the vehicle devices, in particular, the engine starting motor can be rotated only when the driver first opens the vehicle doors in accordance with a predetermined code, secondly depresses a plurality of push-button switches arranged within the passenger compartment in accordance with another predetermined code and lastly depresses a starting switch, even if the vehicle doors are opened incorrectly, it is possible to prevent the vehicle which can be started by only depressing a starting switch from being stolen easily. The system according to the present invention comprises a vehicle device actuating signal generating section similar to a door unlocking signal generating section, an ANDing section and a plurality of devices actuated in response to the ANDed signal, in addition to an ordinary electronic door locking system.

13 Claims, 1 Drawing Figure

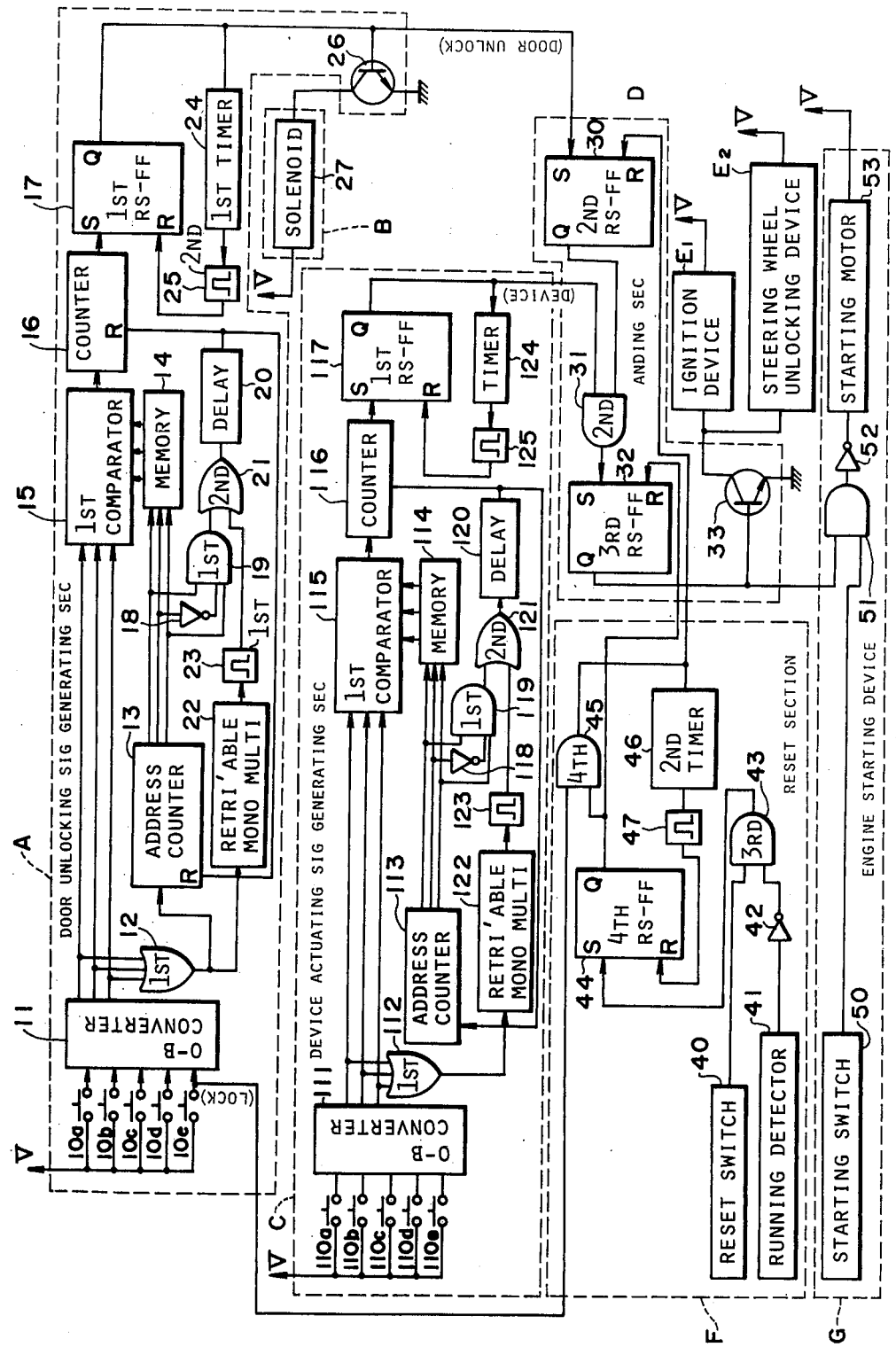

KEYLESS DEVICE ACTUATING SYSTEM FOR AN AUTOMOTIVE VEHICLE

BACKGROUND OF THE INVENTION

1. Field of the Invention

The present invention relates generally to a keyless device actuating system for an automotive vehicle, and more particularly to an electronic vehicle device actuating system combined with an electronic vehicle door locking/unlocking system by which vehicle doors can be locked or unlocked when the driver depresses a plurality of push-button type switches in accordance with a predetermined code.

2. Description of the Prior Art

The background of the present invention will be explained with respect to its application only to the system used with an automotive vehicle.

As is well-known, there have widely been used various keyless device actuating system for an automotive vehicle, for instance, such as an electronic door locking-/unlocking system which can lock or unlock all vehicle doors when the driver depresses a plurality of push-button type switches installed at an appropriate position on the outside of an automotive vehicle in accordance with a predetermined code or when the driver utters a predetermined speech toward a microphone. When such an electronic vehicle door locking/unlocking system as described above is used to lock or unlock the doors, since the vehicle doors can be locked or unlocked by the driver without use of any ignition key, it is very convenient for the driver, in particular, when the vehicle is left parked.

However, even if such a convenient syystem is used for an automotive vehicle, in the case where various vehicle devices or apparatus such as engine starting device, steering wheel locking/unlocking device, car radio, power-operated car-radio antenna telescoping device, etc. are turned on or activated by the use of a key, this keyless device actuating system is not so convenient because the driver must carry the key all the time.

Accordingly, in the case an electronic door locking-/unlocking system is installed in an automotive vehicle, usually the vehicle devices or apparatus are turned on or activated by switches installed within the passenger compartment without use of any key.

In an automotive vehicle as described above, however, in case the vehicle doors are incorrectly unlocked by a thief, the vehicle devices, in particular, the engine starting device may easily be actuated to start the engine by the thief when he simply depresses an engine starting switch, thus there existing the danger that the vehicle is easily stolen.

SUMMARY OF THE INVENTION

With these problems in mind, therefore, it is the primary object of the present invention to provide a keyless device actuating system for an automotive vehicle combined with a vehicle door locking/unlocking system, which can prevent the vehicle provided with an electronic door locking/unlocking system, that is, the keyless vehicle from being stolen by a thief.

In the system according to the present invention, the vehicle devices, in particular, the engine starting device can be actuated only after the driver has depressed a plurality of push-button switches arranged at an appropriate position within the passenger compartment in accordance with a predetermined code. In more detail, when the vehicle is left parked, the driver must first open the vehicle doors by depressing a plurality of push-button switches arranged at an appropriate position on the outside of the vehicle in accordance with a first predetermined code, secondly depresses a plurality of other push-button switches arranged at an appropriate position within the passenger compartment in accordance with a second predetermined code, and lastly depresses an engine starting switch, in order to start the vehicle. Accordingly, even when a thief can incorrectly open the doors of a vehicle left parked, if the thief does not know the second predetermined code to actuate the engine starting device, the vehicle will not be started.

To achieve the above-mentioned object, the keyless device actuating system for an automotive vehicle according to the present invention comprises a device actuating command signal generating section similar to a vehicle door unlocking command signal generating section, an ANDing section for ANDing a vehicle door unlocking command signal and a vehicle device actuating command signal and for outputting a vehicle device control command signal, and at least one device actuated in response to the vehicle device control command signal, in addition to an ordinary electronic vehicle door locking/unlocking system. The devices actuated in response to the above-mentioned control command signal are an engine starting device, an ignition device, a steering wheel unlocking device, a car radio, a power-operated car-radio antenna telescoping device, etc. However, the first three devices are very important from the standpoint of theft prevention.

BRIEF DESCRIPTION OF THE DRAWINGS

The features and advantages of the keyless device actuating system for an automotive vehicle according to the present invention will be more clearly appreciated from the following description of the preferred embodiment of the invention taken in conjunction with the accompanying drawing in which;

The FIGURE is a schematic block diagram of an embodiment of the keyless device actuating system according to the present invention.

DETAILED DESCRIPTION OF THE PREFERRED EMBODIMENTS

First, the circuit configuration of an embodiment of the system according to the present invention will be described hereinbelow with reference to the attached drawing, in which an engine starting device, an ignition device, and a steering wheel unlocking device are actuated, by way of example, in accordance with a second predetermined code without use of any key.

The system according to the present invention can roughly be divided into seven sections: a door locking-/unlocking command signal generating section A, a door unlocking actuator section B, a vehicle device actuating command signal generating section C, an ANDing section D, an ignition device $E_1$, a steering wheel unlocking device $E_2$, an engine starting device G, and a reset section F.

In the door locking/unlocking command signal generating section A, the reference numerals 10a–10e denote a plurality of push-button type switches arranged at an appropriate position on the outer surface of a vehicle door. To unlock vehicle doors, a specific sequence of numerals, such as the five digits "2-1-3-5-4"

are used; while to lock the vehicle doors, a single specific numeral, such as the digit "5" (the fourth of the above five digits) is used. The reference numeral 11 denotes an octal-binary code converter (referred to as O-B converter hereinafter) for converting the octal code designated by the push-button switches 10a–10e into the corresponding three-bit binary code. The reference numeral 12 denotes a first OR gate for generating a H-voltage level output signal whenever the O-B converter 11 outputs a three-bit binary coded signal, and the reference numeral 13 denotes an address counter for generating an address-designating signal which is advanced incrementally by the H-voltage level signals from the OR gate 12.

In other words, when a first signal is inputted to the address counter 13 via the first OR gate 12, the counter 13 outputs a three-bit binary signal "001" to designate address No. 1 in the memory unit 14; when a second signal is inputted to the address counter 13 via the first OR gate 12, the counter 13 outputs a three-bit binary signal "010" to designate address No. 2 in the memory unit, and so on.

The reference numeral 14 denotes a memory unit such as a RAM or ROM in which the above-mentioned numerical code "2-1-3-5-4" is previously stored in the form of binary coded digits. The respective binary coded digits corresponding to the above-mentioned octal code "2-1-3-5-4" are read out sequentially in response to the address-designation signals outputted from the address counter 13. The reference numeral 15 denotes a first comparator for comparing the binary coded digits outputted from the O-B converter 11 with the ones read out from the memory unit 14 and outputting a H-voltage level signal whenever the digits agree, the reference numeral 16 denotes a counter for outputting a signal after the first comparator 15 has inputted the predetermined number of signals (five signals in this embodiment) consecutively thereto, and the reference numeral 17 denotes a first reset-set flip-flop (referred to as RS-FF hereinafter) for generating a door unlocking command signal when set by the output signal from the counter 16.

Further, the reference numeral 18 denotes an inverter, the reference numeral 19 denotes a first AND gate, the reference numeral 20 denotes a delay circuit, and the reference numeral 21 denotes a second OR gate. These elements serves to reset the counter 16 to a L-voltage level a fixed period of time after the predetermined octal unlocking code "2-1-3-5-4" has been inputted to the O-B converter 11 by the driver via the push-button switches 10a–10e.

In more details since the three-bit address signals from the address counter 13 are applied to the respective input terminals of the first AND gate 19, when the last digit of the octal unlocking code is inputted, the address counter 13 outputs a three-bit binary signal "101" (5 in octal code) to designate address No. 5 in the memory unit 14. Therefore, since this three-bit signal is inputted to the first AND gate 19 via the three independent input terminals, the first AND gate 19 outputs a H-voltage level signal, because "0" of the 2nd input terminal is applied to the first AND gate 19 after having been inverted into "1" through the inverter 18. This H-voltage level output signal from the first AND gate 19 is inputted to the delay circuit 20, and, after a fixed period has elapsed, the output signal from the delay circuit 20 resets the counter 16 through the second OR gate 21.

Furthermore, the reference numeral 22 denotes a retriggerable monostable multivibrator which can be retriggered when a H-voltage level signal is inputted thereto within a predetermined period of time but automatically reset to a L-voltage level when no H-voltage level signal is inputted thereto within a predetermined period of time. The reference numeral 23 denotes a first monostable multivibrator which is automatically reset to a L-voltage level after a H-voltage level is kept for a predetermined period of time when triggered. These elements serve to reset the counter 16 to a L-voltage level when the push-button switches are not depressed consecutively, that is, when the switches are depressed intermittently with delays exceeding a predetermined time interval. If the counter 16 is reset before outputting a signal, the first RS-FF 17 will not be set and so will not output a door unlocking signal. In more detail, the output signal from the first OR gate 12 is applied to the retriggerable monostable multivibrator 22 and the first monostable multivibrator 23 is so designed as to be triggered by the trailing edge of the output signal from the retriggerable monostable multivibrator 22. Therefore, in the case where the O-B converter 11 outputs binary coded signals consecutively to the trigger terminal of the retriggerable monostable multivibrator 22, the multivibrator 22 is repeatedly triggered to a H-voltage level without dropping to the L-voltage level as long as the binary coded signals are inputted, therefore, the first monostable multivibrator 23 is not triggered into a H-voltage level (because the first multivibrator 23 can be triggered only when the retriggerable multivibrator 22 changes to a L-voltage level), so that the counter 16 is not reset through the second OR gate 21. In the case where the O-B converter 11 outputs binary coded signals to the trigger terminal of the retriggerable monostable multivibrator 22 intermittently with delays exceeding a predetermined time interval (determined by setting a time constant of the CR circuit in the multivibrator 22), since the retriggerable monostable multivibrator 22 is automatically reset to a L-voltage level before the next binary coded signal from the first OR gate 12 triggers it, the trailing edge of the output signal therefrom triggers the first monostable multivibrator 23, and as a result the counter 16 is reset via the second OR gate 21 to the original condition before it can output a H-level signal to the first RS-FF 17.

Furthermore, after being set, the first RS-FF 17 for outputting a door unlocking signakl is reset after a predetermined period of time by an output signal given from a first timer 24 through a second monostable multivibrator 25 which starts in response to the H-voltage level output signal from the first RS-FF 17.

In the door locking/unlocking command signal generating section A, the reference numeral 26 denotes a transistor which is turned on in response to a door unlocking command signal outputted from the first RS-FF 17.

The door unlocking actuator section B is a solenoid 27. Since a solenoid-energizing coil (not shown) provided in the solenoid 27 is connected between a power supply and the collector of the transistor 26, when the transistor 26 is turned on in response to a door unlocking command signal, the solenoid 27 is energized in the direction to unlock the vehicle doors.

The vehicle device actuating command signal generating section C is almost the same as the door unlocking command signal generating section A in circuit configuration. Therefore, circuit units of the section C corresponding to those of the door unlocking command signal generating section A are denoted by the same reference numerals of one-hundred level, that is, by adding one hundred to each of the reference numerals of the section A. For instance, since the comparator in the section A is denoted by a reference numeral 15, the comparator in the section C is denoted by a reference numeral 115. However, it should be noted that a plurality of push button switches 110a to 110e in the section C are all arranged at an appropriate position within the passenger compartment, while the switches 10a to 10e are all arranged on the outer surface of a vehicle body.

The ANDing section D comprises a second RS-FF 30 which is set in response to a door locking command signal applied from the section A, a second AND gate 31 for ANDing the output signal from the Q terminal of the second RS-FF 30 and a vehicle device actuating command signal applied from the section C, a third RS-FF 32 which is set in response to the signal from the output of this second AND gate 31, and a switching transistor 33 turned on in response to the signal from the Q terminal of the third RS-FF 32.

The ignition device $E_1$ is the one which activates an ignition circuit for the vehicle only when the switching transistor 33 is turned on; and the steering wheel unlocking device $E_2$ is the one which unlocks the steering wheel only when the switching transistor 33 is turned on. Therefore, when the transistor 33 is turned on, the ignition circuit is enabled and the steering wheel is unlocked.

The system resetting section F serves to reset the two second and third RS-FFs 30 and 31 in the ANDing section D, which comprises a reset switch 40 for outputting a H-voltage level signal when turned on and a L-voltage level signal when turned off, a vehicle running detector 41 for outputting a H-voltage level signal when the vehicle is running and a L-voltage level signal while the vehicle stops, an inverter 42, a third AND gate 43 for ANDing the output signals from the reset switch 40 and the inverter 42, a fourth RS-FF 44 which can be set in response to the output signal from the third AND gate 43, a fourth AND gate 45 for ANDing the door locking signal from the door unlocking signal generating section A (in this embodiment, a door locking signal is generated when the push-button switch 10e is depressed by the driver for locking the vehicle doors) and the output signal from the fourth RS-FF 44, a second timer 46 for outputting a signal a predetermined time period after the AND gate 45 outputs a H-voltage level signal, and a one-shot multivibrator 47 for outputting a reset signal to the reset terminal of the fourth RS-FF 44 in response to the trailing edge of the signal from the second timer 46.

The engine starting device G comprises an engine starting switch 50, a fifth AND gate 51 for ANDing the Q-terminal output signal from the third RS-FF 32 and the engine starting signal from the starting switch 50, an inverter 52, and an engine starting motor 53.

The operation of the keyless device actuating system combined with the electronic door locking/unlocking system according to the present nvention will be described briefly hereinbelow.

When the vehicle stops, the driver first depresses the reset switch 40 arranged within the passenger compartment, so that the third RS-FF 32 in the ANDing section D is reset via the third AND gate 43 and the fourth RS-FF 44. Secondly, after he gets out of the vehicle, he depresses a push-button switch (e.g. 10e in this embodiment) to lock the vehicle doors, so that the second RS-FF 30 in the ANDing section D is also reset via the fourth AND gate 45. Therefore, the switching transistor 33 is turned off to disable the ignition device $E_1$ and the steering wheel unlocking device $E_2$ (i.e. ignition is disabled and the steering while is locked). Under these conditions, the vehicle is left parked. When the driver returns to his vehicle, he must first depresses a plurality of push-button switches 10a to 10e (arranged on the outside of the vehicle) in the door unlocking signal generating section A to unlock the doors. When the vehicle doors are unlocked, he gets in his vehicle and next he must next depresses a plurality of push-button switches 110a to 110e (arranged within the passenger compartment) in the device actuating signal generating section C to activate the ANDing section D. Therefore, the second RS-FF 30 and the third RS-FF 32 are both set to output a signal to turn on the transistor 33, with the result that the ignition device $E_1$ and the steering wheel unlocking device $E_2$ and both enabled (i.e. ignition is enabled and the steering wheel is unlocked) and further one input terminal of the fifth AND gate 51 is kept at a H-voltage level. Under these conditions, when the driver turns on the starting switch 50, the starting motor 52 can be rotated to start the engine.

The reason why the second and third RS-FFs 30 and 32 are reset independently by the reset switch 40 and the door locking switch 10e (door locking signal) is as follows: In some cases, for instance, in the case where the vehicle is left parked for a short period within the field of driver's vision, the vehicle is usually required to be left parked without locking the vehicle doors, but with the ignition circuit kept disabled and with the steering wheel kept locked.

In such a case as described above, it is possible to start the engine without procedure of locking/unlocking the vehicle doors in this embodiment. That is to say, when the driver turns on the reset switch 40 after the vehicle stops, only the third RS-FF 32 is reset via the third AND gate 43 and the fourth RS-FF 44, so that the switching transistor 33 is turned off to disable the ignition and to lock the steering wheel. When he returns to his vehicle, since the fourth RS-FF 44 has already been reset automatically by the second timer 46, the third RS-FF 32 is released from the reset condition. Therefore, the vehicle can immediately be started by depressing the push-button switches 110a to 110e arranged within the passenger compartment for setting the RS-FF 32 via the second AND gate 31 (in this state the second RS-FF 30 is left set, because the doors are left unlocked), before turning on the starting switch 50. In other words, the third RS-FF 32 can directly be reset by the reset switch 40; while the second RS-FF 30 is reset by the door locking signal from the switch 10e only when the door is locked within a predetermined time period (the second timer's period) after the reset switch has been depressed. This is because the second RS-FF 30 must be set by the succeeding door unlocking command signal.

Now, follows more detailed description of operation of each section of the system according to the present invention.

In the door unlocking signal generating section A, a sequence of predetermined octal digits (2-1-3-5-4) are first inputted by the driver via the switches 10a to 10e, in order to unlock the vehicle doors. Then, the O-B converter outputs a series of three-bit binary numbers (010-001-011-101-100) corresponding to the octal ones;

whenever the O-B converter outputs a three-bit binary signal, the address counter 13 is advanced incrementally via the first OR gate 12 to output an address designation signal from No. 1 to No. 5, respectively; in response to these address-designation signals the memory unit 4 outputs the three-bit binary codes previously stored in the designated memory addresses; these numbers are compared with the ones outputted from the O-B converter by the first comparator 15; if the numbers match, the comparator 15 outputs a H-level signal; after a series of binary unlocking numbers have been successfully compared, the counter 16 outputs a signal to set the first RS-FF 17, so that a door unlocking signal is outputted. Therefore, the solenoid 27 is energized in the direction to unlock the vehicle doors in response to the unlocking command signal.

Further, when the last unlocking number is inputted and therefore the address-designation signal No. 5 (101) is outputted from the address counter 13, the counter 16 and the address counter 13 are both reset after a predetermined period of time determined by the delay circuit 20. If the unlocking numbers are inputted intermittently with delays exceeding a predetermined time interval, the counter 16 is also reset through the retriggerable monostable multivibrator 22 and the first monostable multivibrator 23.

In the device actuating command signal generating section C, the operation thereof is quite the same as that of the door unlocking command signal generating section A. That is to say, when another sequence of predetermined octal digits are inputted by the driver via the switches 110a to 110e arranged within the passenger compartment, a vehicle device actuating command signal is outputted therefrom. Further, in this embodiment, although the section C is made up of a rather complicated circuit, it is also possible to provide only a signal switch to output a vehicle device actuating command signal.

In the ANDing section D, the second RS-FF 30 is set in response to the door locking command signal applied from the section A to the set terminal S thereof and outputs a H-voltage level signal from the Q-terminal thereof when set. Further, when the device actuating command signal is outputted from the section C after the RS-FF 30 has been set; that is, when the driver depresses the switches 110a to 110e arranged within the passenger compartment after having unlocked the vehicle doors, the second AND gate 31 outputs a H-voltage level signal to the set terminal S of the third RS-FF 32 to set it. As a result, the transistor 33 is turned on in response to the H-voltage level signal from the Q-terminal of the third RS-FF 32 in order to enable the ignition device $E_1$ and the steering wheel unlocking device $E_2$. Therefore, the engine ignition is enabled and the steering wheel is unlocked for standing-by the engine starting.

In the engine starting device G, the fifth AND gate 51 outputs a H-voltage level signal when the starting switch 50 is turned on to start the engine under the conditions that the third RS-FF 32 is kept set outputting a H-voltage level signal to the fifth AND gate 51. As a result, the output terminal of the inverter 52 is grounded to start the starting motor 53. After the engine has been started, the starting switch 50 is, of course, turned off.

In the resetting section F, the running detector 41 always outputs a H-voltage level signal as long as the vehicle is running. As a result, one input terminal of the third AND gate 43 is always kept at a L-voltage level. Therefore, the fourth RS-FF 44 will not be set and, therefore, the third RS-FF 32 also will not be reset while the vehicle is running. In other words, the third RS-FF 32 keeps outputting a H-voltage level signal to the switching transistor 33 for activating the ignition device $E_1$ and the steering wheel unlocking device $E_2$ while the vehicle is running.

However, once the vehicle stops, since the vehicle running detector 41 outputs a L-voltage level signal, one input terminal of the third AND gate 43 is at a H-voltage level, when the reset switch 40 is depressed to output a H-voltage level signal, the third AND gate 43 outputs a H-voltage level signal to set the fourth RS-FF 44, so that the third RS-FF 32 is reset to turn off the switching transistor 33. Therefore, the ignition device and steering wheel unlocking device are both disabled (the ignition is disabled and the steering wheel is locked). When the driver gets out of the vehicle and depresses any one of the push-button switches 10a to 10e (e.g. 10e) to lock the doors within a predetermined time period (the second timer's period), since both the input terminals of the fourth AND gate 45 are at a H-voltage level, a H-voltage level output signal from the AND gate 45 resets the second RS-FF 30. At the same time, since the H-voltage level signal from the AND gate 45 also triggers the second timer 46, after a predetermined time period, the monostable multivibrator 47 is triggered by the trailing edge of the timer signal to reset the fourth RS-FF 44, so that all the RS-FFs 30, 32, and 44 are reset to the original condition.

As already explained, in the case where the driver stops the vehicle (the inverter 42 is at a H-level), turns on the reset switch 40 (the AND gate 43 is at a H-level), and gets out of the vehicle without locking the vehicle, the ignition is disabled and the steering wheel is locked (because the RS-FF 32 is reset to turn off the transistor 33). Thereafter, when he gets in the vehicle and depresses a plurality of push-button switches 110a to 110e in accordance with a predetermined code in order to output a device actuating signal to the second AND gate 31, since the doors are left unlocked (the Q-terminal of the second RS-FF 30 is left at a H-level) the third RS-FF 32 is set to turn on the transistor 33; accordingly, the ignition is enabled and the steering wheel is unlocked; that is to say, the driver can ignite the engine and start the vehicle immediately only by depressing the starting switch 50, when the vehicle is left parked without locking the doors, in the same way as when the vehicle has been left parked with the doors locked.

The above embodiment shows the case where the ignition is enabled and the steering wheel is unlocked when the driver depresses a plurality of push-button switches arranged within the passenger compartment in accordance with a predetermined code, by way of example; however, it is also possible to actuate vehicle devices such as a car radio, power-operated car-radio antenna telescoping device, etc., which can be activated before the engine is started. Further, in the above-mentioned embodiment, the engine is started by use of a starting switch; however, it is of course possible to use an engine key.

As described above, in a vehicle provided with an electronic vehicle door locking/unlocking system by which vehicle doors can be locked or unlocked, without use of any key, when the driver depresses a plurality of push-button switches arranged at an appropriate position on the outside of an automotive vehicle, only when the vehicle doors are unlocked in accordance with a first predetermined code and next a plurality of push-button switches arranged within the passenger compartment are depressed in accordance with a second predetermined code, the vehicle devices such as ignition device, steering wheel unlocking device, car radio, power-operated antenna telescoping device, etc. can be actuated. Therefore, it is possible to prevent the keyless vehicle from being stolen in case the vehicle doors are incorrectly unlocked by a thief.

The system according to the present invention has been disclosed with respect to its application only to the system used with an automotive vehicle. However, it is of course possible to apply the system according to the present invention to other systems in order to increase the safety in dependence upon double codes.

It will be understood by those skilled in the art that the foregoing description is in terms of preferred embodiments of the present invention wherein various changes and modifications may be made without departing from the spirit and scope of the invention, as set forth in the appended claims.

What is claimed is:

1. A keyless device-actuating system for an automotive vehicle combined with an electronic vehicle door locking system, which comprises:
   (a) means for inputting a sequence of vehicle door unlocking coded numbers and at least one vehicle door locking coded number and outputting signals corresponding thereto;
   (b) means for inputting a sequence of vehicle device actuating coded numbers and outputting signals corresponding thereto;
   (c) means for generating a vehicle door unlocking command signal in response to a sequence of the vehicle door unlocking coded numbers outputted from said means for inputting vehicle door unlocking coded numbers;
   (d) means for generating a vehicle device actuating command signal in response to a sequence of the vehicle device actuating coded numbers outputted from said means for inputting vehicle device actuating coded numbers;
   (e) means for unlocking the vehicle doors in response to the vehicle door unlocking command signal outputted from said means for generating a vehicle door unlocking command signal;
   (f) means for ANDing the vehicle door unlocking command signal and the vehicle device actuating command signal and for outputting a vehicle device control command signal; and
   (g) at least one device actuated in response to the vehicle device control command signal from said means for ANDing the two command signals.

2. A keyless device-actuating system for an automotive vehicle as set forth in claim 1, which further comprises means for resetting said ANDing means while the vehicle stops.

3. A keyless device-actuating system for an automotive vehicle as set forth in claim 1, wherein said at least one device actuated in response to the vehicle device control command signal from said means for ANDing the two command signals is an engine starting device.

4. A keyless device-actuating system for an automotive vehicle as set forth in claim 1, wherein said at least one device actuated in response to the vehicle device control command signal from said means for ANDing the two command signals in an ignition device.

5. A keyless device-actuating system for an automotive vehicle as set forth in claim 1, wherein said at least one device actuated in response to the vehicle device control command signal from said means for ANDing the two command signals is a steering wheel unlocking device.

6. A keyless device-actuating system for an automotive vehicle as set forth in claim 1, wherein said at least one device actuated in response to the vehicle device control command signal from said means for ANDing the two command signals is a car-radio.

7. A keyless device-actuating system for an automotive vehicle as set forth in claim 1, wherein said at least one device actuated in response to the vehicle device control command signal from said means for ANDing the two command signals is a power-operated car-radio antenna telescoping device.

8. A keyless device actuating system for an automotive vehicle as set forth in claim 1, wherein said means for inputting a sequence of vehicle door unlocking coded numbers and at least one vehicle door locking coded number is a plurality of push-button switches arranged at an appropriate position on the outside of the vehicle.

9. A keyless device actuating system for an automotive vehicle as set forth in claim 1, wherein said means for inputting a sequence of vehicle device actuating coded numbers is a plurality of push-button switches arranged at an appropriate position within the passenger compartment of the vehicle.

10. A keyless device actuating system for an automotive vehicle as set forth in claim 1, wherein said means for generating a vehicle device actuating command signal comprises:
   (a) an octal-binary code converter connected to said means for inputting a sequence of vehicle device actuating coded numbers for converting the octal coded digits inputted from said inputting means into the corresponding binary coded digits;
   (b) an address counter connected to said octal-binary code converter for counting up a plurality of the binary-coded signals outputted from said octal-binary code converter whenever said inputting means outputs an address-designation signal in response to the number of signals outputted from said octal-binary code converter;
   (c) a memory unit connected to said address counter for outputting a previously stored binary coded signal in response to the address-designation signal outputted from said address counter;
   (d) a first comparator connected to said octal-binary code converter and said memory unit for outputting a signal when one of the binary coded door-unlocking signals outputted from said octal-binary code converter agrees with one of the binary coded door-unlocking signals outputted from said memory unit in response to the respective address-designation signal outputted from said address counter;
   (e) a counter connected to said first comparator for outputting a signal when said first comparator outputs the predetermined number of binary coded signals; and
   (f) a first reset-set flip-flop connected to said counter for outputting a door unlocking command signal when said first counter outputs the signal.

11. A keyless device actuating system for an automotive vehicle as set forth in claim 1, wherein said means for ANDing the vehicle door unlocking command signal and the vehicle device actuating command signal comprises:
(a) a second reset-set flip-flop, the set terminal of which is connected to said means for generting a vehicle door unlocking command signal;
(b) a second AND gate, one input terminal of which is connected to the Q-terminal of said second reset-set flip-flop and the other input terminal of which is connected to said means for generating a vehicle device actuating command signal; and
(c) a third reset-set flip-flop, the set terminal of which is connected to the output terminal of said second AND gate and the Q-terminal of which is connected to said at least one device.

12. A keyless device actuating system for an automotive vehicle as set forth in claim 2, wherein said means for resetting said ANDing means comprises:
(a) a vehicle running detector for outputting a signal while the vehicle stops;
(b) a reset switch;
(c) a third AND gate, one input terminal of which is connected to said vehicle running detector and the other input terminal of which is connected to said reset switch;
(d) a fourth reset-set flip-flop, the set terminal of which is connected to said third AND gate and the Q-terminal of which is connected to said ANDing means, for resetting said ANDing means when said reset switch is depressed while the vehicle stops.

13. A keyless device actuating system for an automotive vehicle as set forth in claim 12, which further comprises a fourth AND gate, one input terminal of which is connected to said means for inputting at least one vehicle door locking coded number, the other input terminal of which is connected to the Q-terminal of said fourth reset-set flip-flop and the output terminal of which is connected to said ANDing means, for resetting said ANDing means in response to a door locking command signal generated after said reset switch is depressed while the vehicle stops.

* * * * *